Jan. 12, 1943. A. E. W. JOHNSON 2,308,367
THRESHER
Filed Dec. 8, 1939

Inventor
A.E.W. Johnson
By Paul O Pippel
Att'y.

Patented Jan. 12, 1943

2,308,367

UNITED STATES PATENT OFFICE 2,308,367

THRESHER

Arnold E. W. Johnson, Chicago, Ill., assignor to International Harvester Company, a corporation of New Jersey Application December 8, 1939, Serial No. 308,284

2 Claims. (Cl. 130—27)

This invention relates to a thresher. More specifically it relates to a novel threshing element or bar adapted to be attached to a threshing cylinder.

The coating of threshing surfaces of bars of a thresher cylinder with rubber is well known. The disadvantage is that rubber wears, and eventually the crops being threshed must come in contact with the metal surfaces of the thresher elements, such contact being objectionable.

An object of the present invention is to provide an improved thresher.

A further object is the provision of an improved rubber-coated thresher element for a threshing cylinder.

According to the present invention the novel thresher elements comprise a radially extending member in the form of an angle bar, having one leg coated with rubber. The outer portion of this leg is bent away from the remainder of the leg in a direction rearwardly of the rotation of the cylinder. The thickness of the coating of rubber over this bent away portion is materially greater than the thickness over the remainder of the leg, and provides an increased threshing surface. The rubber wears off of the bent portion on a plane which intersects a radial line drawn from the center of the circle through the member.

Figure 1:
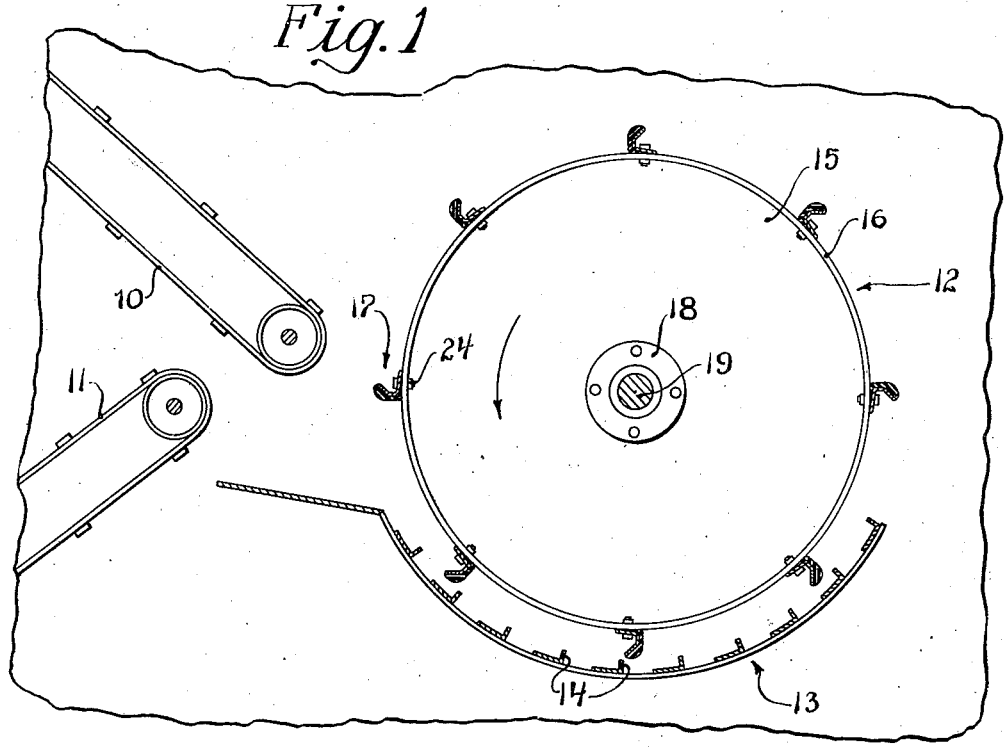
Figure 1 is a section through a thresher showing a thresher cylinder with the novel thresher element attached thereto.
Figure 3:
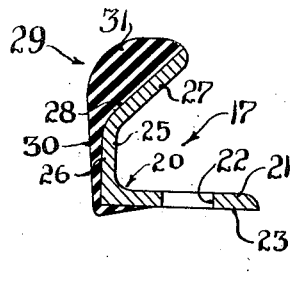
Figure 3 is a section taken along the line 3—3 of Figure 2.
Figure 2:
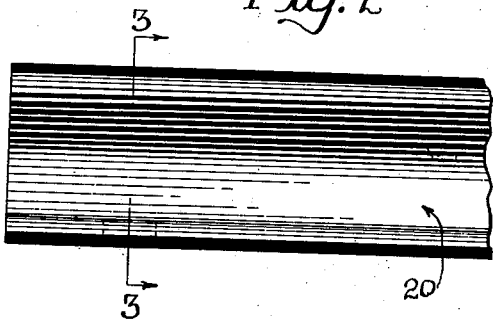
Figure 2 is a side view of a portion of the novel thresher element.

Figure 1 shows diagrammatically a portion of a thresher which includes an upper belt conveyer 10, a lower belt conveyer 11, a thresher cylinder 12, and a concave 13. The concave 13 has a plurality of angle members 14 attached thereto. The thresher cylinder 12 comprises a plurality of plates 15 having peripheral flanges 16, only one plate being shown, and a plurality of thresher elements 17 attached to the flanges 16. The plates 15 are attached by means of brackets 18 to a shaft 19.

The thresher element 17 is formed of an angle member 20. The angle member 20 has a leg 21 provided with an opening 22 and an outer surface 23. The angle member 20 is adapted to be secured to the plates 15 by bolts 24 which extend through the opening 22, and openings in the flanges 16, the outer surfaces 23 of the leg 21 resting against the flanges. The angle member 20 has another leg 25 which extends substantially at right angles to the leg 21 for a portion 26 and then at an acute angle to the leg 21 for a portion 27. The leg 25 has an outer surface 28 to which is bonded a rubber coating 29. The coating 29 is comparatively thin at a portion 30 covering the outer surface 28 of the portion 26 of the leg 25. The coating 29 is at a portion 31 covering the outer surface 28 of the portion 27 of the leg 25 of a substantial thickness in a direction measured transversely to the outer surface 28 of the portion 27.

In operation the conveyers 10 and 11 cause crops to be fed into the thresher cylinder 12. Rotation of the cylinder 12 in the direction of the arrow causes the crops to be fed between the cylinder and the concave 13. Threshing is effected by the beating action of the element 17 and the members 14 upon the crops. The threshing or beating action is greater adjacent the outer portion of the leg 25, and, consequently, wear is greater there. In fact, the rubber coating 29 wears off at an angle to a radial line extending from the center of the cylinder to the apex of the legs 21 and 25. The increased thickness of the portion 21 of the rubber coating 29 compensates for the increased wear. The portion 27 of the leg 25 bent away from the portion 26 of the leg 25 permits the increased thickness. The outermost point of the portion 27 of the metal angle member 20 does not come in contact with the grain, and, therefore, cracking of the grain is substantially reduced.

The intention is to limit the invention only within the scope of the appended claims.

What is claimed is:

1. In a threshing machine having a concave structure provided with a threshing member in the form of a bar extending generally axially of the concave and a cylinder positioned within the concave structure and adapted to be driven in one direction and having a threshing element in the form of a bar extending outwardly for a considerable distance lengthwise of the cylinder and in non-intersecting relation with the threshing member of the concave structure, the combination therewith of a portion of the threshing element provided with a surface extending outwardly from the cylinder at a substantial angle to the radial direction in a direction opposite the direction of rotation of the cylinder and a rubber covering on said surface, the angle of the said surface being approximately equal to the angle of wear caused by crops being threshed between the element on the cylinder and the threshing member on the concave structure so as to cause the rubber covering to wear off parallel to the said surface of the threshing element.

2. In a threshing machine having a concave structure provided with a threshing member in the form of a bar extending generally axially of the concave and a cylinder positioned within the concave structure and adapted to be driven in one direction and having a threshing element in the form of a bar extending for a considerable distance lengthwise of the cylinder and outwardly in non-intersecting relation with the threshing member of the concave structure, the combination therewith of a first portion of the threshing element extending radially outwardly from the threshing cylinder for a substantial distance and a second portion provided with a surface extending outwardly from the said first portion at a substantial angle to the radial direction in a direction opposite the direction of rotation of the cylinder and a rubber covering on said portion of said element and provided with a substantially radial forward face in the direction of rotation and providing a thickened portion of rubber covering said surface, the angle of the said surface being approximately equal to the angle of wear caused by crops being threshed between the element on the cylinder and the member on the concave structure so as to cause the rubber covering to wear off parallel to the said surface of the threshing element.

ARNOLD E. W. JOHNSON.